C. E. DAY.
BORING TOOL HOLDER.
APPLICATION FILED APR. 1, 1909.
971,120. Patented Sept. 27, 1910.
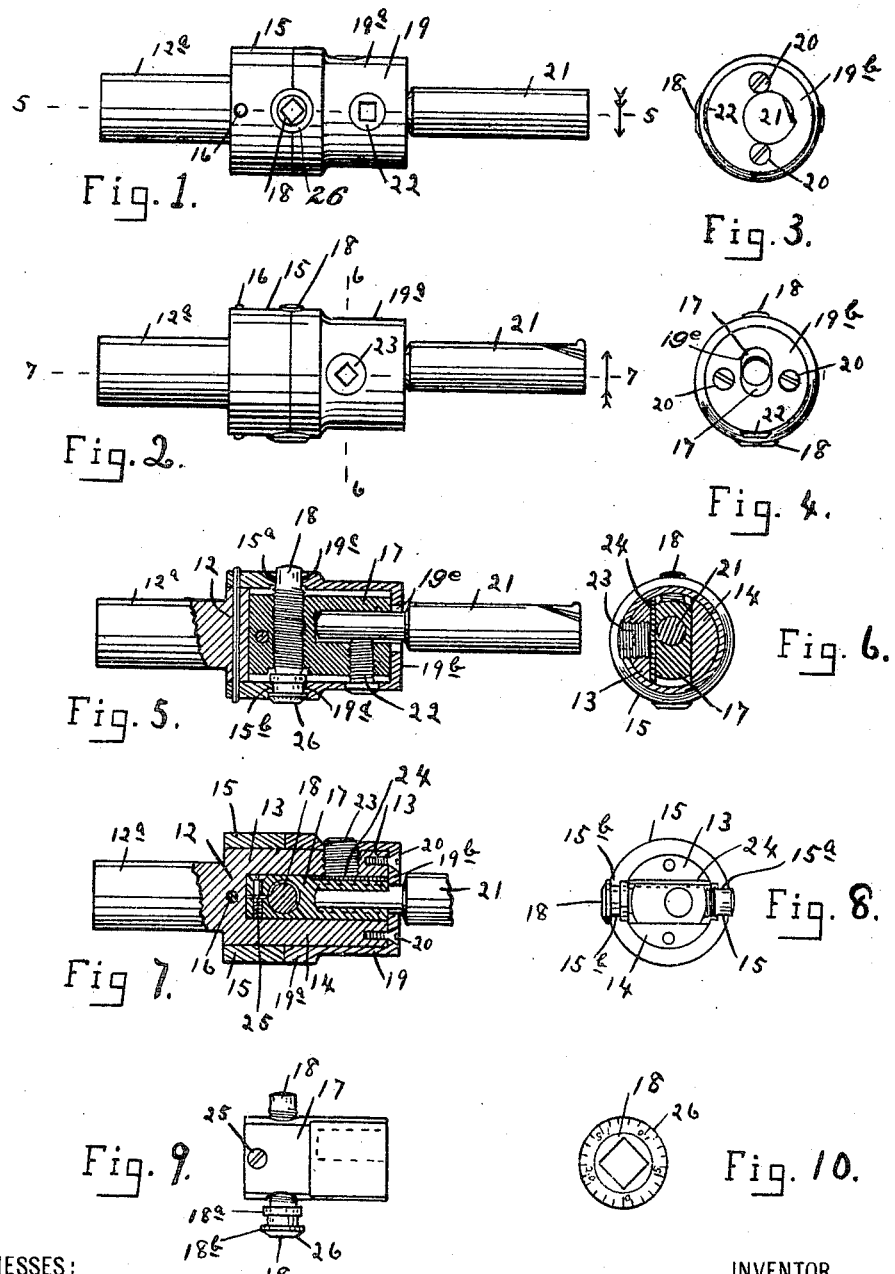
WITNESSES:
Robert E. Jones.
C. Vernet Smith.
INVENTOR
Charles E. Day
BY Geo. E. Rendell
ATTORNEY

UNITED STATES PATENT OFFICE.

CHARLES E. DAY, OF MOHAWK, NEW YORK, ASSIGNOR TO JAMES J. O'HANLON AND REGIS ROUSSEAU, OF ILION, NEW YORK.

BORING-TOOL HOLDER.

971,120.   Specification of Letters Patent.   Patented Sept. 27, 1910.

Application filed April 1, 1909. Serial No. 487,247.

*To all whom it may concern:*

Be it known that I, CHARLES E. DAY, a resident of Mohawk, in the county of Herkimer and State of New York, have invented certain new and useful Improvements in Boring-Tool Holders; and I do hereby declare that the following is a full, clear, and exact description thereof, which will enable others skilled in the art to which it appertains to make and use the same, reference being had to the accompanying drawings, and to the letters of reference marked thereon, which form part of this specification.

The purpose of my present invention is to provide a boring tool holder that is simple in construction and operation, compact, convenient, easily adjusted and of such form, rigidity and adjustment as to fit it for a great variety of uses: It is so made as to admit of very fine adjustment: to allow the boring tool to be removed without disturbing the adjustment and to allow the tool to be adjusted without being removed from the holder. It is particularly adapted to be used in the vertical head of a milling machine but can also be used in the other ordinary ways of a boring tool holder.

A micrometer indicator permits the boring tool to be thrown any desired distance off of center or from the last position.

Figure 1 is a side elevation of the boring tool holder with boring tool. Fig. 2 is a side elevation, the point of view being at right angles to that in Fig. 1. Fig. 3 is a view of the face end of Fig. 1. Fig. 4 is a view of the face end of Fig. 2 without the boring tool. Fig. 5 is a longitudinal sectional view on line 5—5 of Fig. 1. Fig. 6 is a cross sectional view on line 6—6 of Fig. 2. Fig. 7 is a longitudinal sectional view on line 7—7 of Fig. 2. Fig. 8 is a face end view of Fig. 7, with the cap and boring tool removed. Fig. 9 is a plan view of the sliding block and adjusting screw. Fig. 10 is a view on an enlarged scale of the head of the adjusting screw.

Referring to the reference letters and figures of the drawing in a more particular description, 12 is the head transversely slotted, leaving the main side parts 13 and 14 and provided with a shank $12^a$ by means of which the holder may be mounted in a machine. The sides of the slot are parallel with the axis of the head 12 and shank $12^a$. Encircling the head 12 at its shank end and extending part way along the side parts 13 and 14 is a collar 15, held in position by a pin 16 extending through the head. In the slot in the head is placed the adjustable block 17 of the same length as the slot and adapted to be moved transversely therein by means of the adjusting screw 18.

Fitting tightly over the outer ends of the side parts 13 and 14 and the block 17 is a cap 19, the sides $19^a$ of which extend back over the side parts 13 and 14 of the head and the block 17 to the collar 15. The cap 19 is held in position by screws 20 passing through its face, $19^b$, into the ends of the side parts 13 and 14. The block 17 fits and slides between the face part $19^b$ of the cap 19 and the bottom of the slot in the head, both of which are in planes accurately at right angles with the axis of the head and shank. The block 17 is narrower than the width of the slot whereby it is allowed a transverse movement across the axial line of the device. Through the block 17 near its inner end extends the adjusting screw 18 which is screw threaded into the block 17. The adjusting screw 18 has unthreaded portions at each end providing bearings running in half-bearings $15^a$ and $15^b$ in the collar 15 and $19^c$ and $19^d$ in the cap 19. The cap is enlarged as it approaches the collar 15 in order to provide sufficient length to these bearings. The adjusting screw 18 is held from transverse motion in its bearings by means of suitable ridges or collars $18^a$ and $18^b$ formed upon the screw and engaging opposite sides of the half-bearings $15^b$ and $19^d$.

In the face end of the block 17 a socket to receive the shank of the boring tool 21, is provided and so located that when the block 17 is moved to one side of the slot in the head, the boring tool has its axis in the same line as the axis of the tool holder, which position of the block and boring tool for convenience of description I will call its position at center. It is obvious that as the adjusting screw 18 is rotated the block 17 will be moved transversely of the holder and carry the boring tool off of center to an eccentric position. There is an oblong hole 19$^e$ in the face 19$^b$ of the cap corresponding in width and length with the diameter and extreme positions of the shank of the boring tool.

A set screw 22 threaded into the block 17 parallel with the adjusting screw, holds the boring tool in place. The shank of the boring tool preferably has a flattened surface on one side to give the set screw 22 a sure hold. A hole in the side 19$^a$ of the cap as large as the head of the set-screw 22 gives access to the set-screw in all positions of the block 17.

Transversely of the holder and at right angles to the line of motion of the block 17 there is a set-screw 23 threaded into the side 19$^a$ of the cap and through the side part 13 and bearing upon a thin gib 24 which in turn rests upon one wide side of the block 17, which is cut away the thickness and length of the gib 24. The width of the gib is sufficient to reach to the encircling sides 19$^a$ of the cap on each side. In this way only the straight thrust of the set screw is communicated to the block 17 and the accuracy of the adjustment already obtained is not disturbed by the tightening of the set screw 23.

The adjusting screw 18 and the set-screws 22 and 23 are operated preferably by a key fitting into square sockets in their heads. The head of the adjusting screw is provided with a dial 26, to indicate the extent of rotation of the adjusting screw and therefrom the extent of motion of the block and boring tool. The most convenient form of the scale is such as will allow of adjustment to the one-thousandth of an inch, which may be obtained by proper combination of the dial and pitch of thread of the adjusting screw, such for instance, as by having the circumference of the dial divided into 25 equal parts and the adjusting screw provided with 40 threads to the inch. To prevent the slightest lost motion between the adjusting screw 18 and the block 17, the block is split from the screw in a line therewith to the base end, thus allowing the two parts of the end of the block to be sprung together by a screw 25. The adjusting screw 18 preferably has a left hand thread so that a right hand motion of the adjusting screw will result in moving the boring tool away from the center position.

It is obvious that the adjustment can be changed without removing the boring tool and that the boring tool can be removed and replaced without losing the adjustment.

What I claim as new and desire to secure by Letters Patent is:

1. The combination in a boring tool holder of a head having a transverse slot parallel to the axial line of the head, a slide block having a tool holding socket and mounted in the slot in the head for movement transversely of the axis of the head, and a screw for adjusting the block substantially as set forth.

2. The combination in a boring tool holder of a head, a slide block having a tool holding socket and mounted in the head for movement transversely of the axis of the head, a screw for adjusting the block, a collar encircling the head at its shank end, and a cap covering the face end of the head and block and extending back to the collar, said cap and collar limiting the transverse movement of the block and affording bearings for the adjusting screw, substantially as set forth.

3. The combination in a boring tool holder of a head, a slide block having a tool holding socket and mounted in the head for movement transversely of the axis of the head, a screw for adjusting the block, a collar encircling the head at its shank end and a cap covering the face end of the head and block and extending back to the collar, said cap and collar each provided with half-bearings forming bearings for the adjusting screw, substantially as set forth.

4. The combination in a boring tool holder of a head, a slide block having a tool holding socket and mounted in the head for movement transversely of the axis of the head, a collar and a cap encircling the head and each provided with two half bearings and together forming two full bearings, a screw threaded into the block for adjusting the same and provided with unthreaded portions at each end resting in the said bearings and collars on said screw adjacent to opposite sides of the said bearings and holding the screw from transverse movement therein, substantially as set forth.

5. The combination in a boring tool holder of a head, a slide block having a tool holding socket and mounted in the head for movement transversely of the axis of the head, a collar and a cap encircling the head and each provided with two half bearings and together forming two full bearings, a screw threaded into the block for adjusting the same and provided with unthreaded portions at each end resting in the said bearings and having a dial indicating the extent of rotation of the screw and collars on said screw adjacent to opposite sides of the said bearings and holding the screw from transverse movement therein, substantially as set forth.

6. The combination in a boring tool holder of a head having a transverse slot parallel to the axial line of the head, a slide block having a tool holding socket and mounted in the slot in the head for movement transversely of the axis of the head and accurately at right angles with said axial line, a cap confining the block to its said line of movement, and a screw for adjusting the block, substantially as set forth.

7. The combination in a boring tool holder of a head, a slide block having a tool holding socket mounted in the slot in the head for movement transversely of the axis of the head and accurately at right angles with said axial line, a cap confining the block to its said line of movement, a screw for adjusting the block and a supplemental securing device substantially as set forth.

In witness whereof, I have affixed my signature in the presence of two witnesses, this 20th day of March, 1909.

CHARLES E. DAY.

Witnesses:
ROBERT E. JONES,
C. VERULT SMITH.